United States Patent
Schimmel

(10) Patent No.: US 6,601,120 B1
(45) Date of Patent: Jul. 29, 2003

(54) SYSTEM, METHOD AND COMPUTER PROGRAM PRODUCT FOR IMPLEMENTING SCALABLE MULTI-READER/SINGLE-WRITER LOCKS

(75) Inventor: Curt F. Schimmel, San Ramon, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 433 days.

(21) Appl. No.: 09/615,312

(22) Filed: Jul. 13, 2000

(51) Int. Cl.[7] ............................................. G06F 13/00
(52) U.S. Cl. ..................................................... 710/107
(58) Field of Search .................................. 710/107, 200

(56) References Cited

U.S. PATENT DOCUMENTS

| | | | |
|---|---|---|---|
| 5,287,504 A | | 2/1994 | Carpenter et al. .......... 707/201 |
| 5,931,919 A | * | 8/1999 | Thomas et al. .............. 709/315 |
| 6,009,269 A | * | 12/1999 | Burrows et al. ............. 717/130 |

* cited by examiner

*Primary Examiner*—Mark H. Rinehart
*Assistant Examiner*—David Glass
(74) *Attorney, Agent, or Firm*—Sterne, Kessler, Goldstein & Fox, P.L.L.C.

(57) ABSTRACT

An scalable multi-reader/single-writer lock implementation that eliminates contention for lock data structures that can occur in large symmetric multi-processing (SMP) computer systems. The present invention includes a registry head data structure for each critical resource within the computer system. Linked to each of the registry head data structures are one or more client data structures that represent each client (i.e., process, thread, interrupt handler, and the like) that needs read and/or write access to the critical resource represented by the registry head data structure. Further, five operations—Initialization, Adding a Client, Deleting a Client, Obtaining Read Access, and Obtaining Write Access—are provided in order to achieve the goal of contention elimination.

14 Claims, 8 Drawing Sheets

SYSTEM, METHOD AND COMPUTER PROGRAM PRODUCT FOR IMPLEMENTING SCALABLE MULTI-READER/SINGLE-WRITER LOCKS

BACKGROUND OF THE INVENTION

1. Field of the Invention

The present invention relates generally to computer operating systems and more particularly to operating systems that implement locks to control access to critical resources.

2. Related Art

In today's computer systems, it is not uncommon for there to be two or more similar processors connected via a high-bandwidth link and managed by one operating system. Such systems are often referred to as symmetric multi-processing (SMP) systems. Typically, SMP systems employ an operating system (e.g., UNIX, IRIX, Linux or the like) which allows every processor equal access to memory and I/O devices. More specifically, the operating system's kernel—the part of an operating system that is responsible for resource allocation, low-level hardware interfaces, security, etc.—allows application programs to execute on any processor in the computer system, interchangeably, at the operating system's discretion.

Given a multi-processor, multi-application environment, read and write access to shared critical resources within a computer system must be restricted so that race conditions do not arise. That is, multiple processes executing concurrently on multiple processors may need to access a critical resource in order to change a common variable, update a data structure, read a file, write to the file, etc. A number of the processes may desire to only read the contents of the critical resource (i.e., a "reader"), while other processes may desire to update (read and write) the contents of the critical resource (i.e., a "writer"). If two readers simultaneously access the contents of the critical resource, no problems arise. If, however, a writer and another process (i.e., a reader or a writer) simultaneously attempt to access the content of the critical resource, a race condition arises.

In order to avoid (i.e., prevent) race conditions, it must be assured that at any given time, only one writer has exclusive access to a given critical resource. One solution is to implement a mutual exclusion (mutex) lock (also referred to as a semaphore). Mutex locks, which are well-known in the relevant art(s), use a central data structure which encompasses a protected variable. Mutex locks only allow one process to access a critical resource—read or write—and force other processes to wait for access to the critical resource by either "spinning" (i.e., performing no-ops while waiting) or "sleeping" (i.e., blocking and placing itself in a waiting queue).

Another solution is to use multi-reader locks, which are also well-known in the relevant art(s). Multi-reader locks are similar to mutex locks, but as their name suggests, allow multiple readers to simultaneously access the critical resource. When multiple readers simultaneously access a critical resource, a race condition does not occur because the resource is not being modified—only read.

Although useful for solving contention issues in SMP systems, multireader locks are limited. That is, conventional implementations of multi-reader locks only really work well in situations where contention is not high. That is, contention problems occur in conventional implementations because all readers and writers are forced to access (and hence contend for) a centralized data structure (i.e., the lock), before they obtain access to the critical resource. This is counter-productive because the aim of a multi-reader lock is to allow readers to proceed in parallel. Yet, the readers are all contending for the global multi-reader lock data structure. In other words, conventional implementations of multi-reader locks frequently breakdown on large CPU count computer systems when too many readers arrive at the lock at the same time. This causes severe cache contention problems for the lock data structures themselves.

The above-described problem is exacerbated in today's computer systems that have cache-coherent non-uniform memory access (ccNUMA) architectures. In the situation where all of an SMP computer system's CPUs are requesting the lock in read mode, a bottleneck on the lock data structure will still occur. The performance of multi-reader locks, in this situation, is no better than a normal mutex lock.

Therefore, given the foregoing, what is needed is a system, method and computer program product for scalable multi-reader/single-writer locks that overcomes the deficiencies of conventional mutex and multi-reader locks. The system, method and computer program product should allow readers to proceed in parallel without contending for a common resource.

SUMMARY OF THE INVENTION

The present invention is directed to a system, method and computer program product for implementing a scalable multi-reader/single-writer lock, within a computer operating system, that meets the above-identified needs.

The system of the present invention includes a registry head data structure for each critical resource within the computer system that requires a multi-reader lock. Linked to each of the registry head data structures are one or more client data structures that represent each client (i.e., process, thread, interrupt handler, or the like) that needs read and/or write access to the critical resource represented by the registry head data structure.

The method and computer program of the present invention involve initializing a registry head data structure for each critical resource in the computer system that one or more clients need write and/or read access to. That is, a registry data structure corresponding to a critical resource within the computer system is allocated. The registry data structure includes a writer flag initialized to zero and a spin lock initialized to a unlocked state.

Further, a plurality of client data structures, linked to the registry data structure, are allocated. Each of the client data structures includes a read enable flag initialized to one, and a read use flag initialized to zero. Each client data structure corresponds to one of a plurality of clients within the computer system which desires read and write access to the critical resource.

Reading the critical resource involves determining, by a client, whether the client's read enable flag is set to one. If not, this indicates that a writer is currently updating the critical resource and thus the client must spin (i.e., wait). If yes, the client sets its read use flag to one and then performs at least one read operation on the critical resource. Once the client is done with its read operation(s) on the critical resource, the client resets the read use flag, within its client data structure, to zero. Note that the reader is not required to access the registry head data structure or obtain the global spin lock, thus avoiding contention in the common case.

Writing to the critical resource involves a client obtaining the registry head data structure's spin lock in order to change its state to a locked state. Then, the client traverses every other client's client data structure to determine if all the read use flags are set to zero. If not, the client must wait as a non-zero state indicates that another client is currently reading the critical resource. If yes, the client sets the read enable flag to zero within the client data structure of the other clients. This prevents any other client from reading the critical resource while one client is attempting to write to it.

Next, the client updates the value of the writer flag (i.e., sets it equal to one) within the registry head data structure. This prevents any other client from also becoming a writer. The client then releases the spin lock by changing its state to the unlocked state. This allows other operations which do not interfere with the write operation (e.g., the deleting a client data structure operation) to proceed. After the client performs its write operation(s) on the critical resource, the spin lock is once again obtained by the client in order to change its state to the locked state. The client then traverses every other client's client data structure and sets the read enable flag back to one. The value of the writer flag is set back to zero and the spin lock is released by changing its state to the unlocked state.

An advantage of the present invention is that it does not utilize a centralized multi-reader data structure, but instead employs a unique data structure for each client thereby allowing parallelism for the read case.

Another advantage of the present invention is that it assumes writers are rare and readers are the more common case. Consequently, the invention "pre-approves" readers by not requiring them to access the registry head data structure or obtain the global spin lock, thereby eliminating contention in the more common case.

Yet another advantage of the present invention is that it utilizes dynamic data structures which grow and shrink during operation of the computer system, rather than conventional static data structure lock implementations.

A further advantage of the present invention is that it can be implemented in a distributed cluster environment.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

Table of Contents

I. Overview
II. Detailed Operation
  A. Initialization
  B. Adding a Client
  C. Deleting a Client
  D. Obtaining Read Access
  E. Obtaining Write Access
III. Environment
IV. Conclusion I. Overview This present invention addresses the implementation of a scalable multi-reader/single-writer lock, within a computer operating system, that eliminates the need for the conventional multi-reader lock implementations that use a centralized data structure protected by a spin lock.

Figure 1:
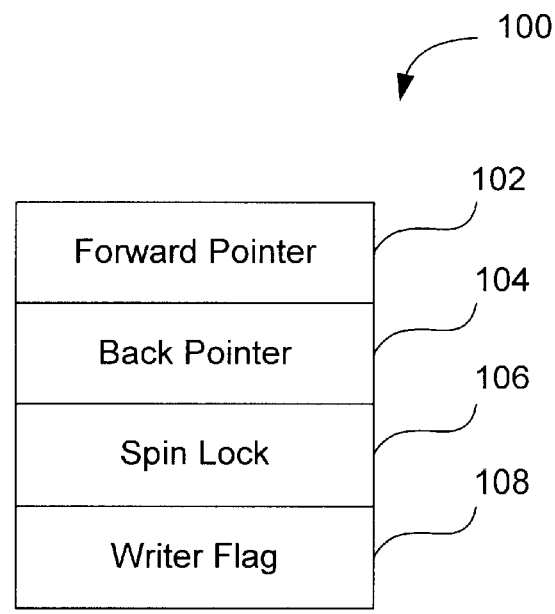
FIG. 1 is a block diagram illustrating a registry head data structure according to an embodiment of the present invention.

Referring to FIG. 1, a registry head data structure 100 according to an embodiment of the present invention, is shown. In a preferred embodiment, the present invention utilizes a single registry head data structure 100 for each critical resource within the computer system that requires a multi-reader lock. This registry head data structure 100 can be created at boot time or subsequently dynamically created during operation of the computer system. Registry head data structure 100 includes a forward pointer 102, a backward pointer 104, a spin lock 106, and a writer flag 108. These components of the registry head data structure 100 are explained in more detail below.

In addition to the registry head data structure 100, the present invention utilizes a client data structure for each client of the lock within the computer system.

Figure 2:
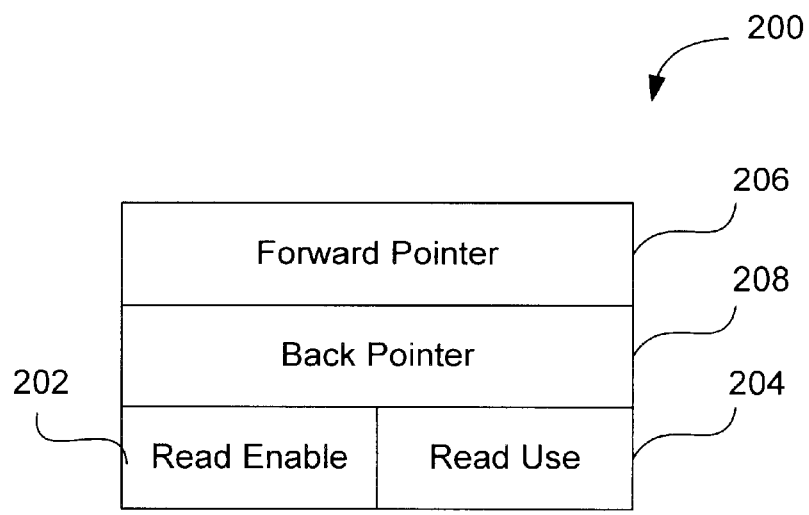
FIG. 2 is block diagram illustrating a client data structure according to an embodiment of the present invention.

Referring to FIG. 2, a client data structure 200 according to an embodiment of the present invention, is shown. Client data structure 200 includes a read enable bit field 202 (i.e., a read enable flag), a read use bit field 204 (i.e., a read use flag), a forward pointer 206, and a back pointer 208. These components of the client data structure 200 are explained in more detail below.

As will be explained in more detail below, the client data structures 200 are linked to, and obtain read and write access to one of the computer system's critical resources strictly through, the single registry head data structure 100 for that particular critical resource. In a preferred embodiment, the registry head data structure is linked to the one or more client data structures 200 via a double linked-list. Thus, the registry head data structure 100 contains a forward pointer 102 and back pointer 104, and the client data structure 200 contains a forward pointer 206 and a back pointer 208.

Figure 3:
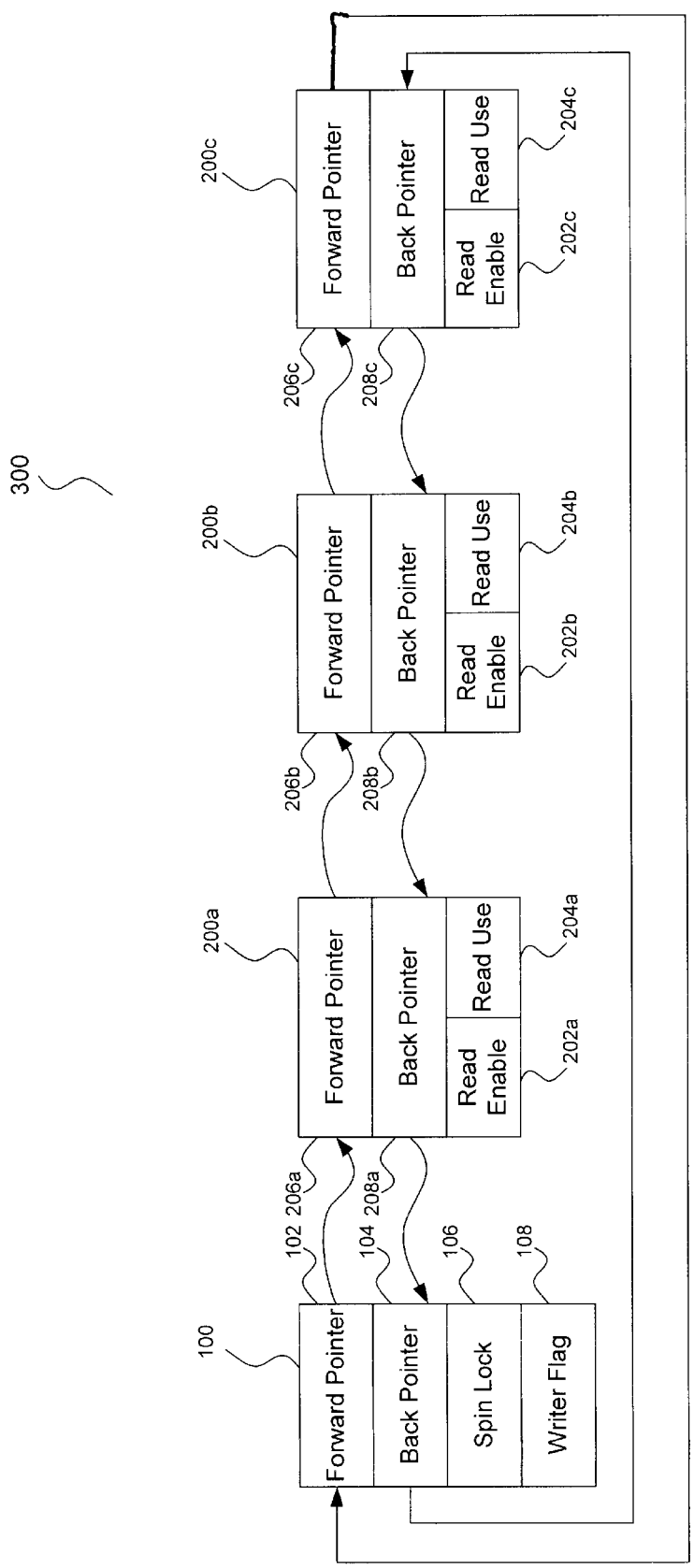
FIG. 3 is a block diagram illustrating the overall operating environment according to an embodiment of the present invention.

Referring to FIG. 3, a block diagram 300 is shown where multiple client data structures 200 (shown as client data structures 200a through 200n) are linked to a critical resource's registry head data structure 100, thus forming a registry of all clients that may utilize the lock. In an alternative embodiment, the registry head data structure 100 can be implemented using a data structure other than a double linked-list (e.g., a linear list, hash table, etc.). As will be apparent to those skilled in the relevant art(s), any alternative embodiments of the registry head data structure 100 would also require changes in the access methods and links to data structures 100 and 200 than those described herein (e.g., linear operations for a linear list implementation of registry head 100, or hash operations for a hash table implementation of registry head 100, etc.).

As suggested by block diagram 300, the ability of multiple clients executing within the computer system (represented by data structures 200a–200n) to write to a critical resource would be controlled through a respective registry head data structure 100. That is, in order to obtain write access to a critical resource, each client must first access the registry head data structure 100 for the critical resource, thus avoiding race conditions. Further, read access for each client is controlled through the client's own data structure 200. This allows multiple clients to obtain read access in parallel and without contention.

The present invention is described in terms of the above example. This is for convenience only and is not intended to limit the application of the present invention. In fact, after reading the following description, it will be apparent to one skilled in the relevant art(s) how to implement the following invention in alternative embodiments (e.g., operating systems that employ sleep queues rather than spin locks, etc.).

The term "client" is used throughout herein to refer to computer system processes such as, without limitation, threads, interrupt handlers, application processes, operating system routines, and the like, that would access, use, and/or benefit from the scalable multi-reader/single-writer lock of the present invention.

II. Detailed Operation

In a preferred embodiment, the scalable multi-reader/single-writer lock of the present invention may be best described in terms of five operations: Initialization, Adding a Client, Deleting a Client, Obtaining Read Access, and Obtaining Write Access. These five operations are described in detail below.

A. Initialization

Figure 4:
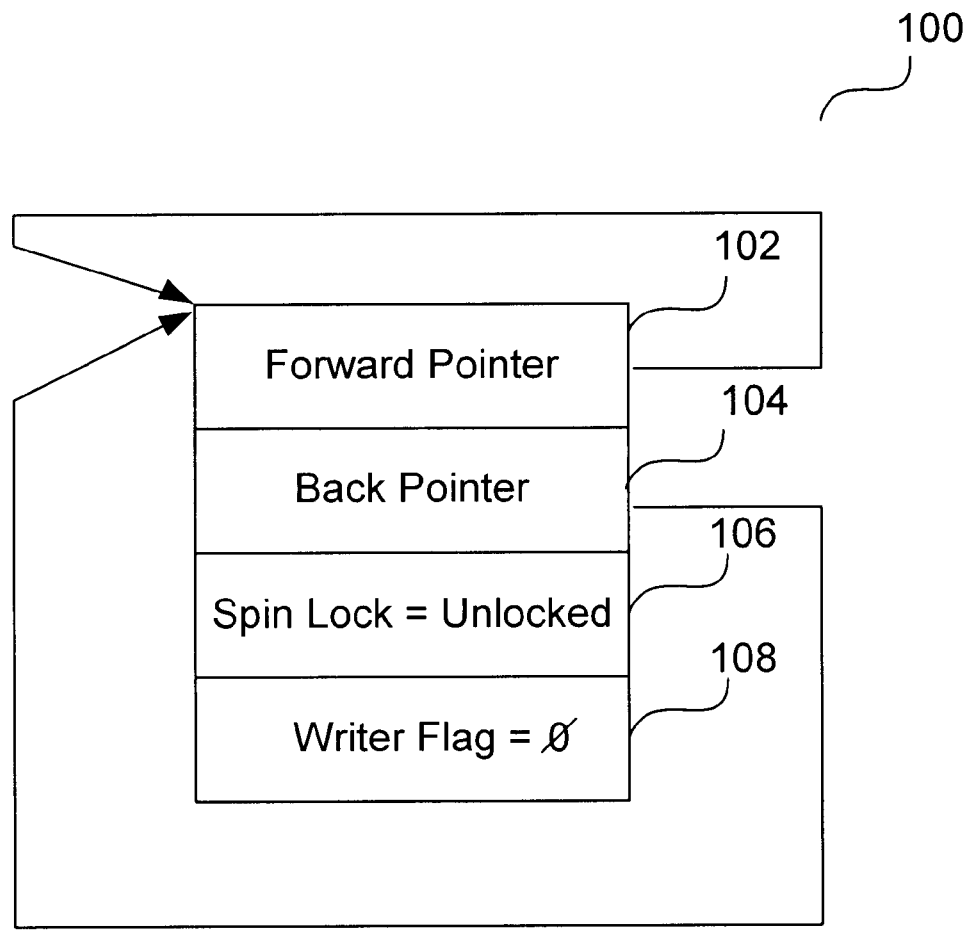
FIG. 4 is block diagram of the registry head data structure in its initial state, according to an embodiment of the present invention.

Referring to FIG. 4, the result of the Initialization operation, according to an embodiment of the present invention, is shown. As suggested above, the registry head data structure 100 can be created at boot time or subsequently dynamically created during operation of the computer system. As a result of the initialization operation, both the forward pointer 102 and the back pointer 104 each points to data structure 100, and the write flag 108 is set to zero (0). Also as a result of the initialization operation, the spin lock 106 is set to the "unlocked" state. As is well-known in the relevant art(s), a spin lock is a multi-processor mutual exclusion mechanism used to prevent race conditions. Spin locks are typically implemented using a single word in memory that reflects its current status—locked (e.g., 1) or unlocked (e.g., 0). The spin lock 106 protects the registry head data structure 100 and updates to the double-linked list.

B. Adding a Client

Figure 5:
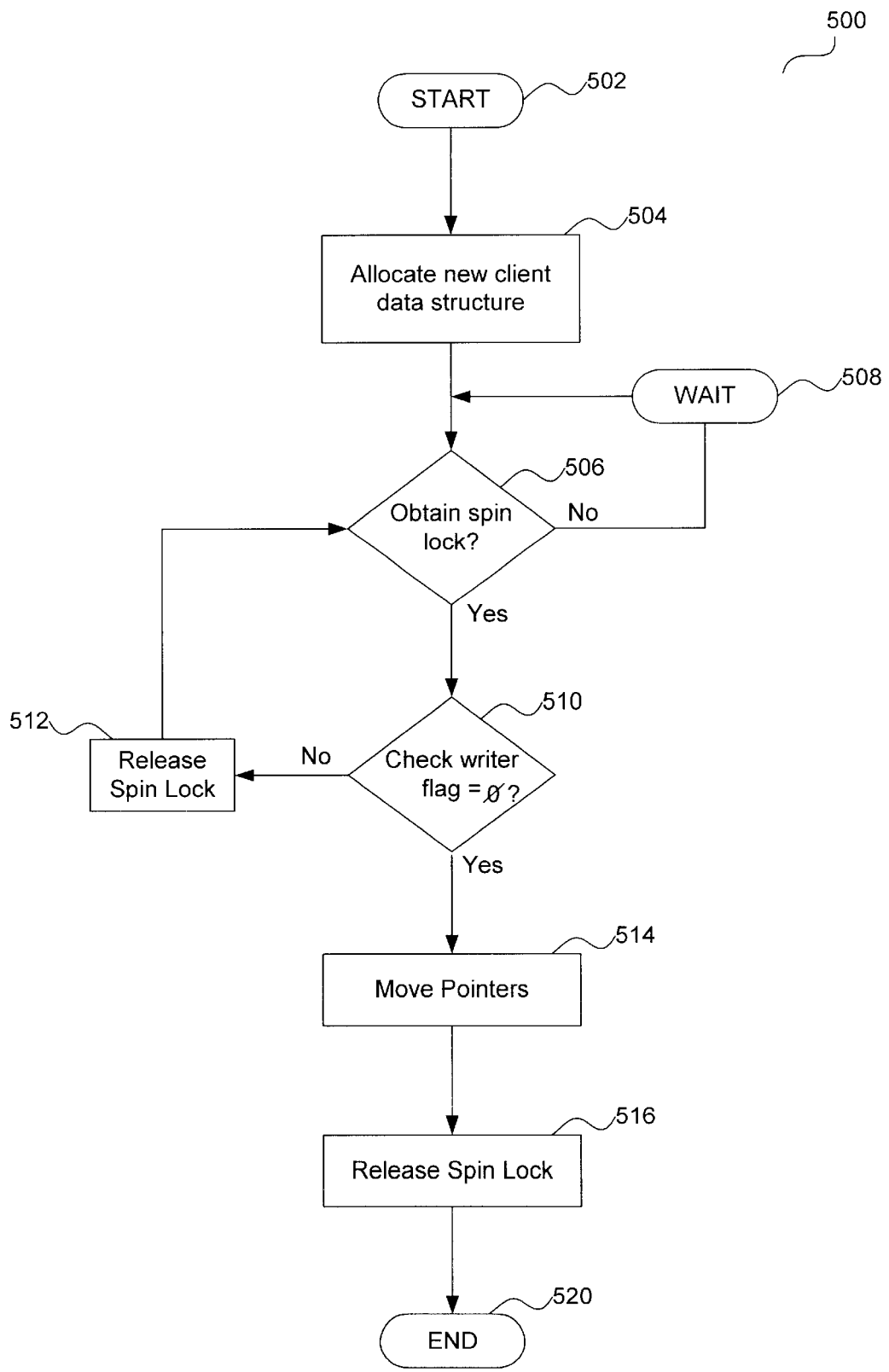
FIG. 5 is a flowchart detailing the Adding a Client operation according to an embodiment of the present invention.

Referring to FIG. 5, a flowchart 500 detailing the Adding a Client operation of the present invention, is shown. Flowchart 500 begins at step 502 with control passing immediately to step 504. In step 504, a new client data structure 200 is allocated to represent a new client within the computer system which may access (i.e., read and/or write) a critical system resource represented by a particular registry head data structure 100. Within the newly allocated client data structure, the read enable bit 202 is set to one and the read use bit 204 is set to zero as default (i.e., initial) values. As will be explained in more detail below, the read enable bit 202, when set to one, indicates when the client is allowed to have read access to a critical resource. Thus, clients are "pre-approved" for read access to critical resources. Further, the read use bit 204, when set to one, indicates when the client is actually reading the critical resource.

In step 506, the new client needs to obtain the spin lock 106 before adding the new data structure 200 to registry 100. Thus, the new client attempts to obtain the spin lock 106 within the registry head data structure 100. If the spin lock 106 is not available (i.e., it is not in the "unlocked" state, but in a "locked" state), the client must wait (i.e., "spin") as indicated in step 508 and re-attempt to obtain the lock 106. If the spin lock 106 is available (i.e., "unlocked"), the client obtains the lock and sets it to a "locked" state.

In step 510, the client checks the value of the writer flag 108. If the writer flag 106 is not equal to zero (i.e., there is a client currently writing to the critical resource represented by the registry data structure 100), the client must wait. Thus, in step 512 the client has to release the spin lock 106 in order to allow the writer to first obtain the spin lock 106 and clear the writer flag 108 when the writer is finished writing to the critical resource. (See FIG. 8.) Thus, the newly added client must return to step 506 to re-obtain the spin lock as indicated in FIG. 5.

In a preferred embodiment, if a writer is found in step 510 (i.e., the writer flag 108 is not equal to zero), then the new client could clear the read enable flag 202 within its newly allocated client data structure 200 and directly proceed to insert it into the linked list in step 514. This would eliminate the need to loop (i.e., repeat steps 506–512) and wait for the writer to finish.

If (in step 510) the writer flag 108 is equal to zero (i.e., there are no clients currently writing to the critical resource represented by the registry data structure 100), then the client causes the pointers of the double linked-list of clients linked to the registry data structure 100 to move in step 514. (See FIG. 3.) As will be appreciated by those skilled in the relevant art(s), step 514 is in essence a double linked-list insert operation. Specifically, both the forward pointer 206 and backward pointer 208 of the new client data structure 200 need to be set to point the previous and next data structures, respectively, on the linked list (which may be just the registry head data structure 100 in the case where the list is empty). Also, the new client data structure 200 may be inserted either at the head or tail of the list, and consequently an implementation may have to either update forward pointer 102 or backward pointer 104 (or both in the case where the list is empty). In the general case, a total of four pointers will require updating.

In step 516, once the client has moved the pointers (i.e., inserted its client data structure 200 into the double linked-list), it will release the spin lock 106 it obtained in step 506. Flowchart 500 (i.e., the Add a Client operation) then ends as indicated by step 520.

C. Deleting a Client

Figure 6:
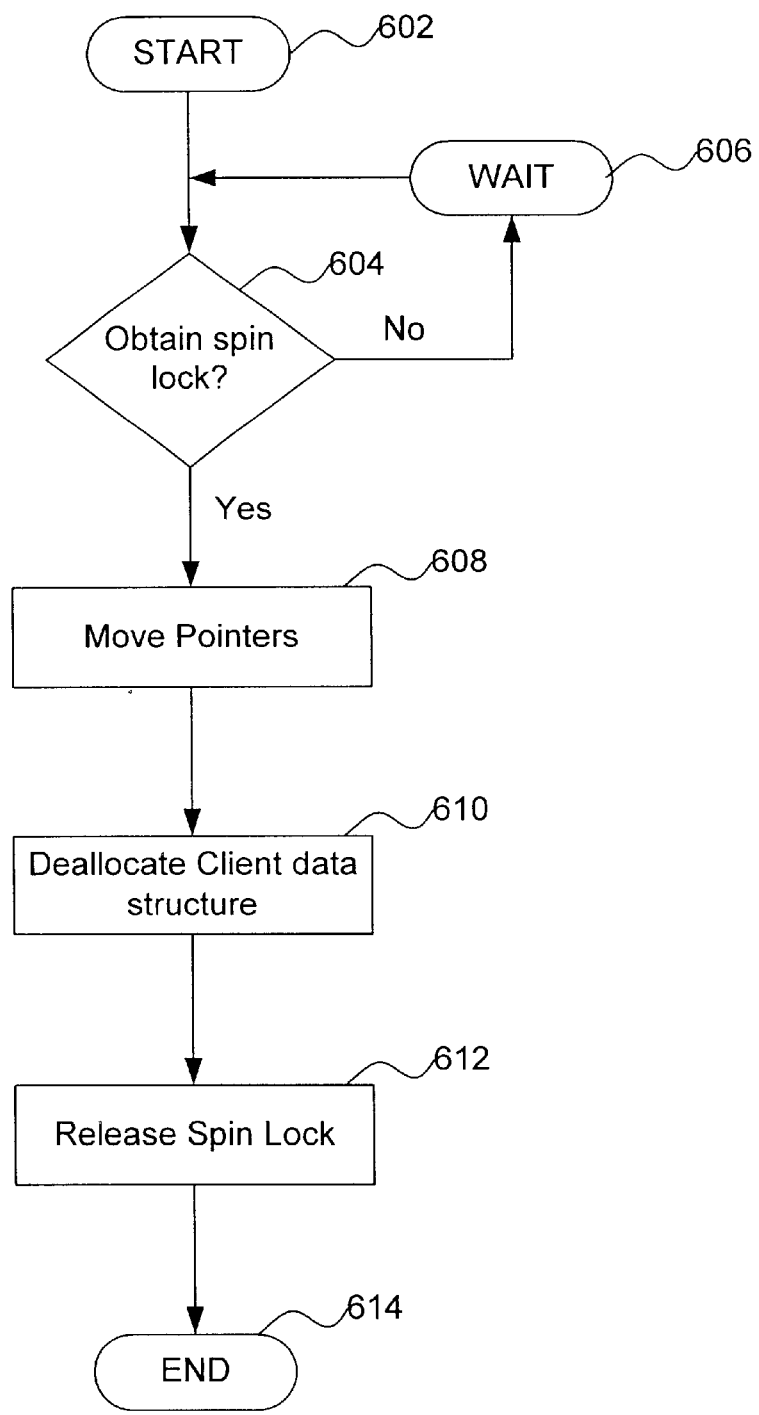
FIG. 6 is a flowchart detailing the Delete a Client operation according to an embodiment of the present invention.

Referring to FIG. 6, a flowchart 600 detailing the Delete a Client operation of the present invention, is shown. Flowchart 600 begins at step 602 with control passing immediately to step 604. In step 604, the client data structure 200 attempts to obtain the spin lock 106 within the registry head data structure 100. If the spin lock 106 is not available, the client must wait (i.e., "spin") as indicated in step 606 and re-attempt to obtain the lock 106. If the spin lock 106 is available, the client obtains the lock and sets it to a "locked" state. Then, in step 608, the client causes the pointers of the double linked-list of clients linked to the registry data structure 100 to move. (See FIG. 3.)

As will be appreciated by those skilled in the relevant art(s), step 608 is in essence a double linked-list remove operation where, in the general case, a total of four pointers will require updating as explained above with reference to flowchart 500.

In step 610, once the client has moved the pointers (i.e., removed its client data structure 200 from the double linked-list), it will deallocate the memory associated with the client data structure 200 within the computer system. Then, in step 612, it will release the spin lock 106 it obtained in step 604. Flowchart 600 (i.e., the Delete a Client operation) then ends as indicated by step 614.

D. Obtaining Read Access

Figure 7:
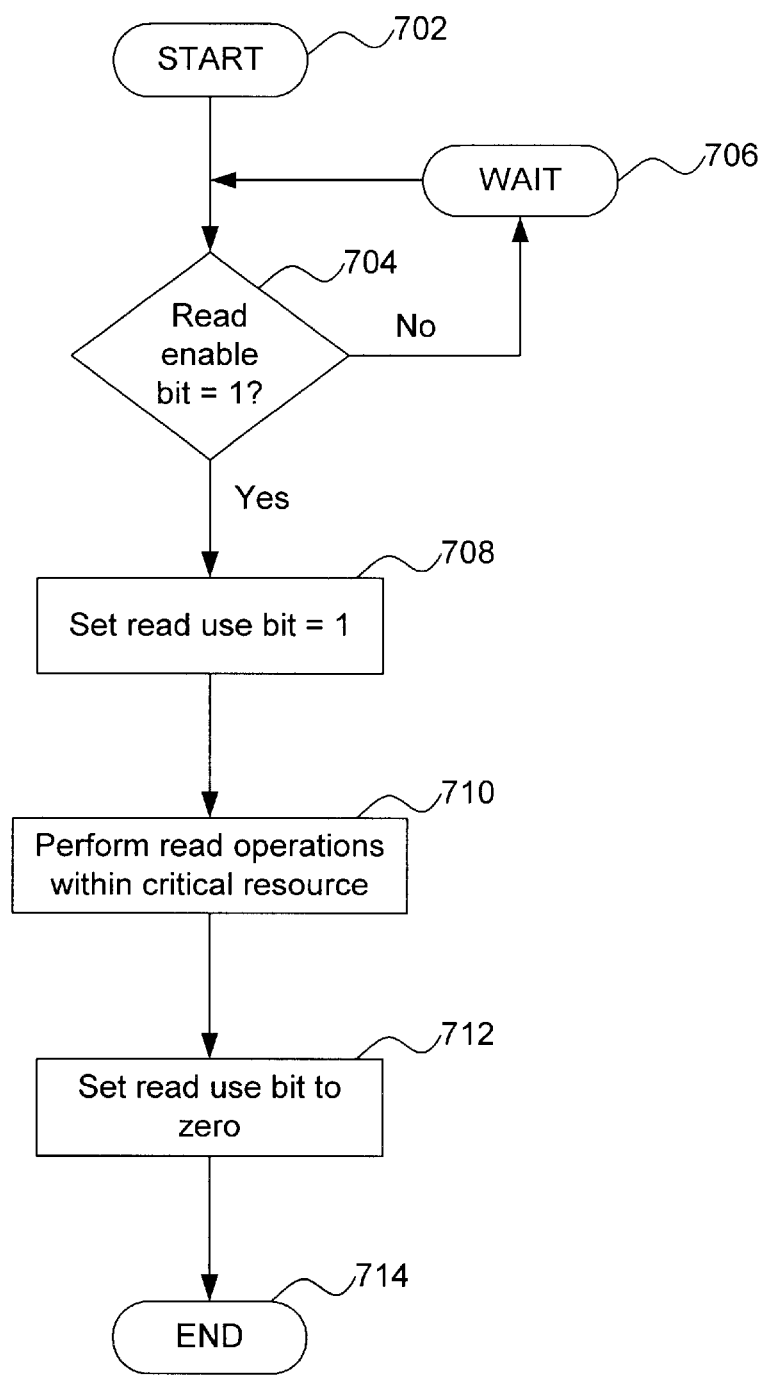
FIG. 7 is a flowchart detailing the Obtaining Read Access operation according to an embodiment of the present invention.

Referring to FIG. 7, a flowchart 700 detailing the Obtain Read Access operation of the present invention, is shown. Flowchart 700 begins at step 702 with control passing immediately to step 704. In step 704, the client checks its client data structure 200 to determine if the read enable bit 202 is set to one (1). If not, the client will spin until this condition is true as indicated by step 706. If the read enable bit 202 is set to one, the client sets its read use bit 204 to one in step 708.

In a preferred embodiment of the present invention, the determination of whether the value of the read enable bit 202 is one (step 704) and setting the read use bit 204 to one (step 708) should be implemented as a single atomic operation within the operating system of the computer system. This will avoid any race conditions.

Then, in step 710, the client may perform read operation(s) on the critical resource. Once the client concludes performing the read operation(s), in step 712, it resets its read use bit 204 to zero. Flowchart 700 (i.e., the Obtain Read Access operation) then ends as indicated by step 714.

One will note how the present invention eliminates contention since each client uses its own data structure 200 and does not access the registry head data structure 100 during the above-described Obtain Read Access operation.

E. Obtaining Write Access

Figure 8:
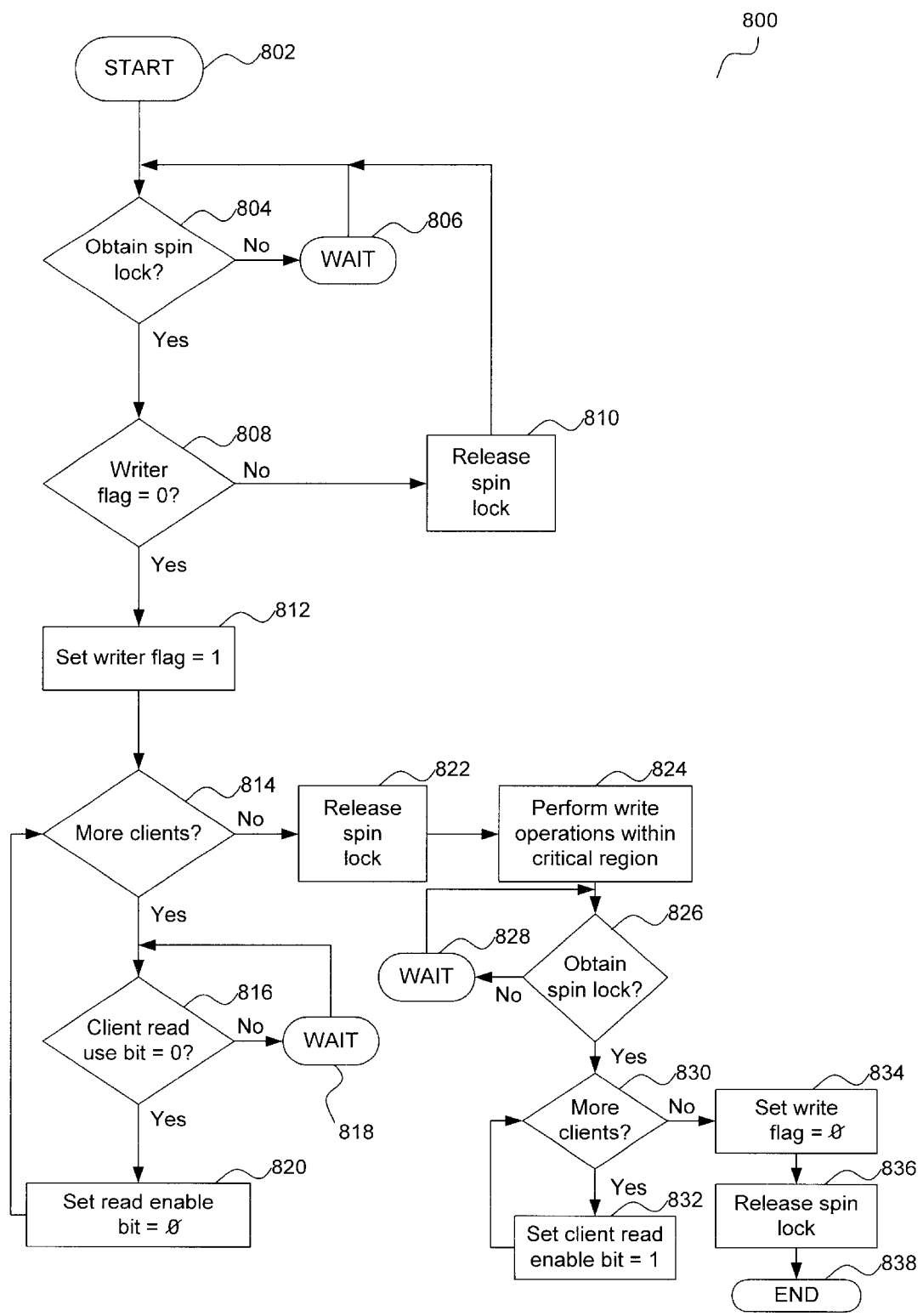
FIG. 8 is a flowchart detailing the Obtaining Write Access operation according to an embodiment of the present invention.

Referring to FIG. 8, a flowchart 800 detailing the Obtain Write Access operation of the present invention, is shown. Flowchart 800 begins at step 802 with control passing immediately to step 804. In step 804, the client attempts to obtain the spin lock 106 within the registry head data structure 100. If the spin lock 106 is not available (i.e., its state is not "unlocked"), the client must spin as indicated in step 806 and re-attempt to obtain the lock 106. If the spin lock 106 is available (i.e., its state is unlocked), the client obtains the lock and sets it to a "locked" state.

In step 808, the client determines if the writer flag 108 is set to zero. If the writer flag 106 is set to zero, the client sets it to one in step 812. If the writer flag 106 is not set to zero, the client must wait. Thus, in step 810 the client has to release the spin lock 106 in order to allow the client currently writing to the critical resource to first obtain the spin lock 106 and clear the writer flag 108 when the writer is finished. Thus, the client trying to obtain write access must return to step 804 to re-obtain the spin lock as indicated in FIG. 8.

In step 814, the client proceeds to traverse (i.e., "walk") the double linked-list to determine if there are other clients besides itself. If yes, in step 816, the client checks each of the other client's data structure 200 to determine if the read use bit 204 is zero. If any other client's read use bit 204 is not zero, the client must spin until this condition is true as indicated by step 818. If the read use bit 204 is determined to be zero in step 816, the read enable bit 202 is also set to zero in step 820. The client repeats steps 814–820 for each and every client linked to the register head data structure 100. (See FIG. 3.)

In a preferred embodiment of the present invention, the determination of whether the value of the read use bit 204 is zero (step 816) and setting the read enable bit 202 to zero (step 820) should be implemented as a single atomic operation within the operating system of the computer system. This will avoid any race conditions.

Once the client which seeks to obtain write access sets every other client's read enable bit 202 to zero, it releases the spin lock 106 in step 822. By releasing the spin lock 106 prior to actually performing any write operation within the critical region, the Obtain Write Access operation allows the Add a Client Operation (flowchart 500) or the Delete a Client operation (flowchart 600) to proceed without any further waiting.

Now, in step 824, the client may perform write operation(s) within region. Once the client concludes performing the write operation(s), it once again attempts to obtain the spin lock 106 in step 826. If the spin lock 106 is not available (i.e., its state is not "unlocked"), the client must spin as indicated in step 828 and re-attempt to obtain the spin lock 106. If the spin lock 106 is available (i.e., its state is unlocked), the client obtains the lock and sets it to a "locked" state. In step 830, the client then proceeds to once again traverse (i.e., "walk") the double linked-list to determine if there are other clients besides itself. If yes, in step 832, the client resets each other client's read enable bit 202 to one. Then, in step 834, the client resets the writer flag 108 to zero. The client then releases the spin lock in step 836. Flowchart 800 (i.e., the Obtain Write Access operation) then ends as indicated by step 838.

As mentioned above, it will be apparent to one skilled in the relevant art(s) how to implement the following invention in an alternative embodiment where sleep queues are utilized rather than the spin lock 106 within data structure 100. Consequently, the waiting of steps 508, 512, 606, 706, 806, 810, 818 and 828 described above would involve "sleeping" (i.e., a client blocking and placing itself in a sleep queue) rather than spinning. Both spin and sleep locks are described in detail in C. Schimmel, *UNIX® Systems for Modern Architectures: Symmetric Multiprocessing and Caching for Kernel Programmers,* ISBN 0-201-63338-8, Addison-Wesley (1994), which is incorporated herein by reference in its entirety.

III. Environment

The present invention may be implemented using hardware, software or a combination thereof and may be implemented in one or more computer systems or other processing systems. In fact, in one embodiment, the invention is directed toward one or more computer systems capable of carrying out the functionality described herein.

Figure 9:
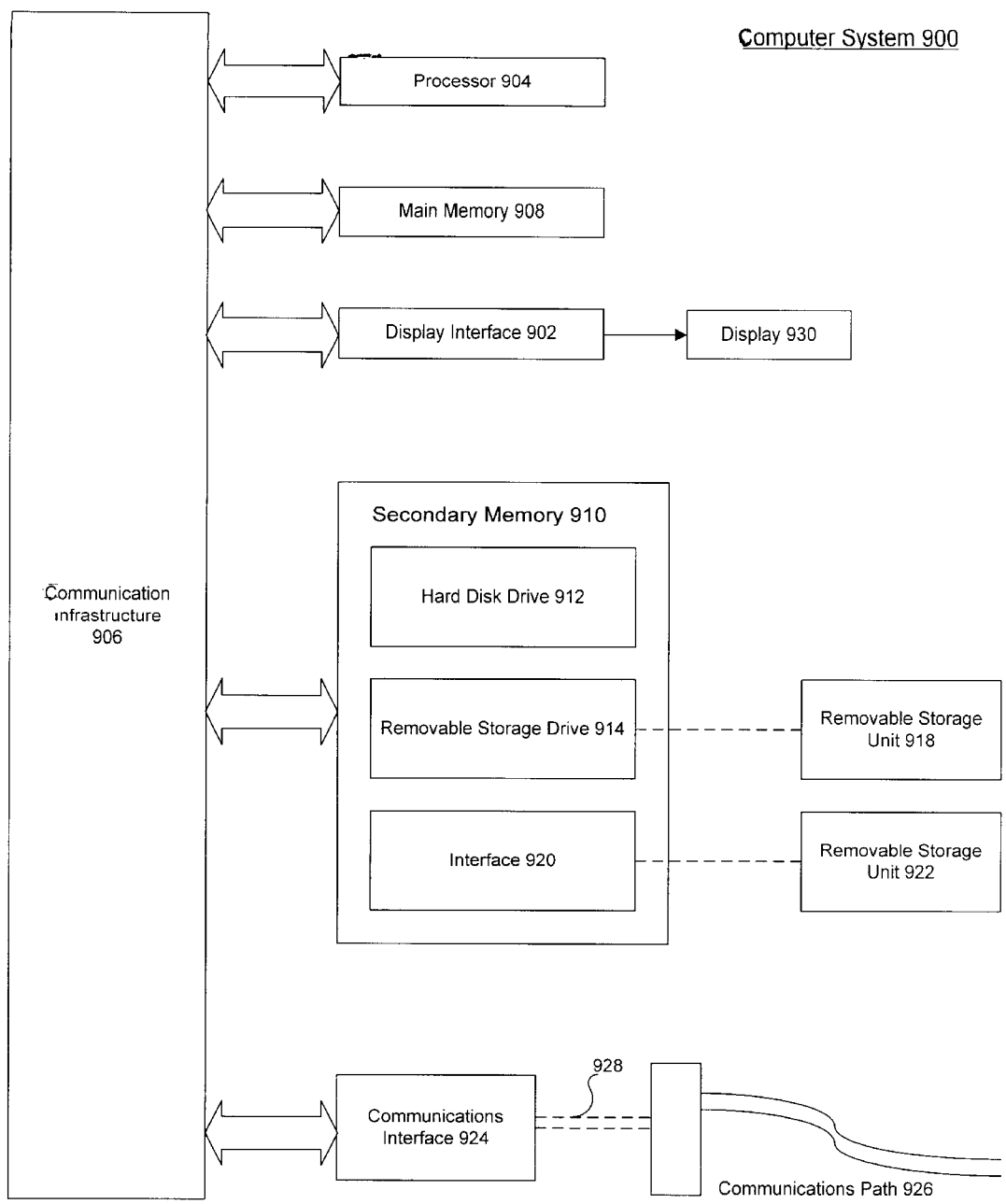
FIG. 9 is a block diagram of an example computer system for implementing the present invention.

An example of a computer system 900 is shown in FIG. 9. The computer system 900 represents any single or multi-processor computer. The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a PCM-CIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path (i.e., channel) 926. This channel 926 carries signals 928 and may be implemented using wire or cable, fiber optics, a phone line, a cellular phone link, an RF link and other communications channels.

In this document, the terms "computer program medium" and "computer usable medium" are used to generally refer to media such as removable storage drive 914, a hard disk installed in hard disk drive 912, and signals 928. These computer program products are means for providing software to computer system 900. The invention is directed to such computer program products.

Computer programs (also called computer control logic) are stored in main memory 908 and/or secondary memory 910. Computer programs may also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. CONCLUSION

While various embodiments of the present invention have been described above, it should be understood that they have been presented by way of example, and not limitation. Further, it will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for implementing a scalable multi-reader/single-writer lock within a computer system, comprising the steps of:

(1) allocating a registry data structure corresponding to a resource within the computer system;

(2) allocating a client data structure, linked to said registry data structure, corresponding to a client within the computer system which requires read access to said resource, wherein said client data structure comprises a read enable flag initialized to a first enable state, and a read use flag initialized to a first use state;

(3) determining, by said client, whether said read enable flag is set to said first enable state;

(4) setting, by said client, said read use flag to a second use state when the determination of step (3) is positive;

(5) performing, by said client, at least one read operation on said resource; and (6) setting, by said client, said read use flag to said first use state when step (5) is completed;

whereby the scalable multi-reader/single-writer lock allows readers to proceed in parallel without contending for a common resource within the computer system.

2. The method of claim 1, wherein steps (3) and (4) are performed as a single atomic operation within the operating system of the computer system.

3. The method of claim 1, wherein:

said first enable state is equal to one;

said first use state is equal to zero; and said second use state is equal to one.

4. The method of claim 1, wherein said client data structure is linked to said registry data structure using a double linked-list.

5. A method for implementing a scalable multi-reader/ single-writer lock within a computer system, comprising the steps of:

(1) allocating a registry data structure corresponding to a resource within the computer system, wherein said registry data structure comprises a writer flag initialized to a first write state and a spin lock initialized to a unlocked state;

(2) allocating a plurality of client data structures, linked to said registry data structure, each corresponding to a plurality of clients within the computer system which require write access to said resource, wherein each of said plurality of client data structures comprises a read enable flag initialized to a first enable state, and a read use flag initialized to a first use state; and (3) performing, by one of said plurality of clients, at least one write operation on said resource, said performing step comprising the steps of:

(a) obtaining said spin lock in order to change its state to a locked state;

(b) determining if said read use flag is set to said first use state within others of said plurality of client data structures;

(c) setting said read enable flag within said others of said plurality of client data structures to a second enable state when the determination of step (b) is positive;

(d) updating the value of said writer flag to a second write state; and (e) releasing said spin lock by changing its state to said unlocked state;

whereby the scalable multi-reader/single-writer lock avoids race conditions by assuring only a single writer can access the contents of said resource.

6. The method of claim 5, wherein said plurality of client data structures are linked to said registry data structure using a double linked-list.

7. The method of claim 5, wherein step (3) further comprises the steps of:

(f) obtaining, after performing at least one write operation on said resource, said spin lock in order to change its state to said locked state;

(g) setting said read enable flag within said others of said plurality of client data structures to said first enable state;

(h) updating the value of said writer flag to said first write state; and (i) releasing said spin lock by changing its state to said unlocked state.

8. The method of claim 7, wherein:

said first write state is equal to zero;

said second write state is equal to one;

said first enable state is equal to one;

said second enable state is equal to zero;

said first use state is equal to zero; and said second use state is equal to one.

9. A system for implementing a scalable multi-reader/ single-writer lock within a computer system, comprising:

(a) a registry data structure corresponding to a resource within the computer system, wherein said registry data structure comprises:

(i) a writer flag initialized a first write state;

(ii) and a spin lock initialized to a unlocked state;

(b) a plurality of client data structures, linked to said registry data structure, corresponding to a plurality of clients within the computer system which desire read and write access to said resource, each of said plurality of client data structures comprising:

(i) a read enable flag initialized to a first enable state; and (ii) a read use flag initialized to a first us e state;

(c) means for each of said plurality of clients to:

(i) obtain said spin lock in order to change its state to a locked state, (ii) determine if said read use flag is set to said first use state within each of said plurality of client data structures, (iii) set said read enable flag within each of said plurality of clients data structures a second enable state, and (iv) update the value of said writer flag to a second write state, before performing at least one write operation on said resource; and (d) means for each of said plurality of clients to set said read use flag within its corresponding said plurality of client data structures to a second use state before performing at least one read operation on said resource;

whereby the scalable multi-reader/single-writer lock allows readers to proceed in parallel without contending for a common resource within the computer system, and avoids race conditions by assuring only a single writer can access the contents of said resource.

10. A system for implementing a scalable multi-reader/ single-writer lock, within the operating system of a computer system, comprising:

a registry data structure corresponding to a resource within the computer system;

a plurality of clients within the computer system which require read access to said resource;

a plurality of client data structures, linked to said registry data structure, each corresponding to one of said plurality of clients, wherein each of said client data structures comprises a read enable flag indicating that said client is preapproved to read said resource; and means for one of said plurality of clients to disable said read enable flag corresponding to others of said plurality of clients before performing at least one write operation on said resource;

wherein the scalable multi-reader/single-writer lock allows said plurality of clients to obtain read access to said resource in parallel without contending for said registry data structure, and avoids race conditions within the computer system by assuring only a single one of said plurality of clients can obtain write access to the contents of said resource at one time.

11. A computer program product comprising a computer usable medium having control logic stored therein for causing a computer to implement a scalable multi-reader/single-writer lock within its operating system, said control logic comprising:

first computer readable program code means for causing the computer to allocate a registry data structure corresponding to a resource within the computer;

second computer readable program code means for causing the computer to allocate a client data structure, linked to said registry data structure, corresponding to a client within the computer which requires read access to said resource, wherein said client data structure comprises a read enable flag initialized to a first enable state, and a read use flag initialized to a first use state;

third computer readable program code means for causing the computer to determine whether said read enable flag is set to said first enable state;

fourth computer readable program code means for causing the computer to set said read use flag to a second use state when the determination of said third computer readable program code means is positive;

fifth computer readable program code means for causing the computer to allow said client to perform at least one read operation on said resource; and sixth computer readable program code means for causing the computer to set said read use flag to said first use state when said client has completed said at least one read operation on said resource;

whereby the scalable multi-reader/single-writer lock allows readers to proceed in parallel without contending for a common resource within the computer.

12. The computer program product of claim 11, wherein said third and fourth computer readable program code means are performed as a single atomic operation within the operating system of the computer system.

13. A computer program product comprising a computer usable medium having control logic stored therein for causing a computer to implement a scalable multi-reader/single-writer lock within its operating system, said control logic comprising:

first computer readable program code means for causing the computer to allocate a registry data structure corresponding to a resource within the computer, wherein said registry data structure comprises a writer flag initialized to a first write state and a spin lock initialized to a unlocked state;

second computer readable program code means for causing the computer to allocate a plurality of client data structures, linked to said registry data structure, each corresponding to a plurality of clients within the computer which require write access to said resource, wherein each of said plurality of client data structures comprises a read enable flag initialized to a first enable state, and a read use flag initialized to a first use state; and third computer readable program code means for causing the computer to allow one of said plurality of clients to perform at least one write operation on said resource, said third computer readable program code means comprising:

fourth computer readable program code means for causing the computer to obtain said spin lock in order to change its state to a locked state;

fifth computer readable program code means for causing the computer to determine if said read use flag is set to said first use state within others of said plurality of client data structures;

sixth computer readable program code means for causing the computer to set said read enable flag within said others of said plurality of client data structures to said first enable state when the determination of said fifth computer readable program code means is positive;

seventh computer readable program code means for causing the computer to update the value of said writer flag to a second write state; and eighth computer readable program code means for causing the computer to release said spin lock by changing its state to said unlocked state;

whereby the scalable multi-reader/single-writer lock avoids race conditions by assuring only a single writer can access the contents of said resource.

14. The computer program product of claim 13, wherein said third computer readable program code means further comprises:

ninth computer readable program code means for causing the computer to obtain, after said one of said plurality of clients performs at least one write operation on said resource, said spin lock in order to change its state to said locked state;

tenth computer readable program code means for causing the computer to set said read enable flag within said others of said plurality of client data structures to said first enable state;

eleventh computer readable program code means for causing the computer to update the value of said writer flag to said first write state; and twelfth computer readable program code means for causing the computer to release said spin lock by changing its state to said unlocked state.

* * * * *